United States Patent Office 3,006,924
Patented Oct. 31, 1961

3,006,924
ADRENOCHROME DERIVATIVE
Desider Fleischhacker, New York, and Norman Barsel, Laurelton, N.Y., assignors to International Hormones, Inc., Hicksville, N.Y., a corporation of New York
No Drawing. Filed May 4, 1960, Ser. No. 26,682
3 Claims. (Cl. 260—319)

The present invention relates to a novel adrenochrome derivative.

More particularly, the present invention relates to derivatives of adrenochrome with carboxyethoxyl-amine (amino-oxyacetic acid) and to water soluble salts thereof.

In the United States Patent No. 2,506,294 of May 2, 1950, there is disclosed certain adrenochrome derivatives such as the monosemicarbozone, the oxime, etc. These derivatives unlike adrenochrome are stable and of value for their haemostatic properties. These derivatives of adrenochrome are substantially insoluble in water and their utilization is thereby impaired. In our U.S. Patent No. 2,581,850 of January 8, 1952, there is disclosed the combination of these derivatives of adrenochrome with for example, alkali metal salicylates. This combination has a practical solubility in water or saline of up to about 15 mg. of per cc. and therefore renders a compound such as adrenochrome monosemicarbozone highly useful for the relief of capillary bleeding, for example, since effective doses may be readily administered by injection of a few cc. of solution.

In order to achieve the desired solubility characteristics, however, the combination of salicylate and adrenochrome semicarbozone or oxime involves the use of large proportions of sodium salicylate; a ratio of 25:1 being desirable. In order to minimize the use of salicylates other combinations have been suggested but in each case high proportions of solubilizing agent were found necessary.

In accordance with the present invention the surprising discovery has been made that stable derivatives of adrenochrome may be produced by the reaction of adrenochrome with aminooxyacetic acid and that these derivatives in the form of their soluble salts are readily soluble to the extent of 30 mg. or more per cc. in water or saline solutions. The novel compounds of the present invention i.e. the amino-oxyacetic acid derivatives of adrenochrome and especially the non-toxic water soluble salts thereof are valuable thereapeutics for the relief of capillary type bleeding both in the form of aqueous solution or in dry form i.e. in the form of tablets made with the usual binders, fillers, etc.

The novel compounds of the present invention are illustrated by the following formula:

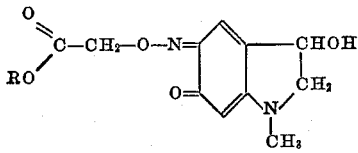

wherein R represents hydrogen or a non-toxic water soluble salt forming cation of the types well known in the pharmaceutical art. For example, R may represent an alkali metal such as sodium or potassium, ammonium or may be derived from organic bases such as methylamine, ethylamine, ethanolamine, diethanolamine, triethanolamine, etc.

The process for forming the novel compounds of the present invention is illustrated by the following equation:

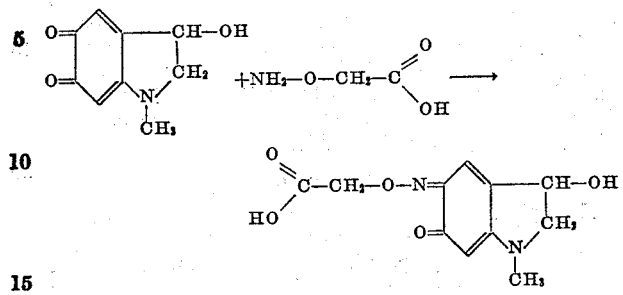

In accordance with the process above outlined which discloses the production of the free acid derivative, the hydrochloride of amino-oxyacetic acid is dissolved in an organic solvent preferably a lower aliphatic alcohol such as methanol with warming for rapid solution and the adrenochrome was then added in alcohol-water solution. Preferably, adrenochrome is used as freshly prepared and still wet with the methanol of the preparatory solution. The solutions of reacting components are mixed and are then allowed to stand for a substantial period of time of the order of 2 hours or longer, thereafter the reaction mixture is kept in a refrigerator at about 45° C. for several hours. The precipitate of the amino-oxyacetic acid derivative of adrenochrome is then filtered off and then washed with cold methanol and dried.

To form soluble salts the amino-oxyacetic acid derivative of adrenochrome is reacted with a base such as sodium hydroxide or potassium hydroxide or an amine of the type previously set forth in water solution. An especially desirable form of the alkali metal base is in the form of the bicarbonate or other basic salt.

The following specific examples serve to illustrate but are not intended to limit the present invention.

*Example I*

25 grams of amino-oxyacetic acid hydrochloride in 250 cc. of 50% methanol was warmed to effect a solution and then was reacted with 30 grams of adrenochrome in 500 cc. of 50% methanol. The two solutions were mixed and permitted to stand for about 3 hours and then put into a refrigerator overnight. The precipitate was filtered and washed with small quantities of ice cold methanol and dried in a desiccator. The yield was 20.1 grams of the amino-oxyacetic-acid derivative of adrenochrome having a decomposition point between 123 and 127° C.

The formula of this new compound was as follows:

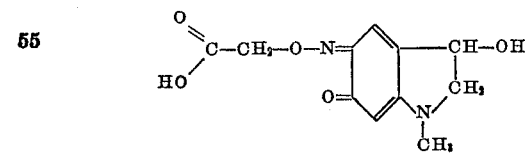

*Example II*

A 0.1 molar solution of 1 liter of sodium bicarbonate (8.4 grams) in water was prepared and to this solution while stirring there was added 0.1 mol (25.2 grams) of the amino-oxyacetic-acid derivative of adrenochrome.

This was stirred, if desired with slight warming up to 30 or 40° C. until the derivative went completely into solution. The liter solution contained 27.5 grams of the sodium salt of the amino-oxyacetic acid derivative of adrenochrome. For use as haemostetic compound the solution as prepared was aseptically filtered in a conventional way in order to remove any bacteria. It was then charged into 1 cc. ampules and each ampule contained 27.5 mg. of the sodium salt of this compound. By adjusting the amount of reacting components a solution of any desired strength could be made i.e. as for example, 5 mg. per cc., or 2 mg. per cc., or 10 mg. per cc. Upon injection of 2 mg. or more a definite anti-bleeding effect was produced in mammals wherein the bleeding was due to capillary rupture. To form a solid material the solution was lyophilized at −20° C. to prepare a pure powdery material, which could be readily redissolved in water to form ampules or compounded along with the conventional pill forming ingredient into tablets.

*Example III*

Example II was repeated except that 0.1 mol of potassium bicarbonate was used and the corresponding potassium salt was prepared. When a 0.1 molar solution of potassium hydroxide was used instead of the potassium bicarbonate the same salt was prepared. Similarly, a reaction with ammonium hydroxide gave the ammonium salt and a reaction with triethanol amine gave the corresponding triethanol amine salt.

We claim:

1. A compound of the formula:

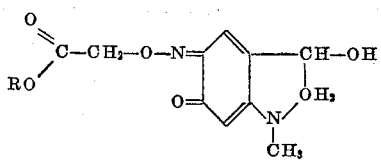

wherein R is selected from the group consisting of hydrogen and a non-toxic water soluble pharmacologically salt forming cation.

2. The amino-oxyacetic acid derivative of adrenochrome having the following formula:

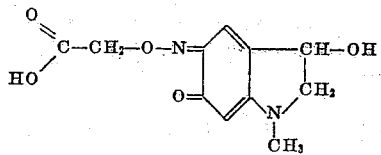

3. The sodium salt of the amino-oxyacetic acid dereviative of adrenochrome having the following formula:

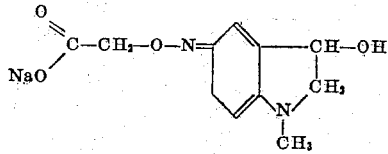

No references cited.